(12) United States Patent
Kikuchi et al.

(10) Patent No.: US 7,213,253 B2
(45) Date of Patent: *May 1, 2007

(54) OPTICAL RECORDING MEDIUM AND METHOD OF MANUFACTURING THE SAME

(75) Inventors: Minoru Kikuchi, Miyagi (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/104,910

(22) Filed: Apr. 13, 2005

(65) Prior Publication Data

US 2005/0201245 A1    Sep. 15, 2005

Related U.S. Application Data

(63) Continuation of application No. 09/971,180, filed on Oct. 4, 2001, now Pat. No. 6,889,381.

(30) Foreign Application Priority Data

Oct. 6, 2000    (JP) ............................. 2000-307201

(51) Int. Cl.
G11B 7/24    (2006.01)
G11B 7/26    (2006.01)

(52) U.S. Cl. ...................... 720/719; 369/283; 369/286; 720/718

(58) Field of Classification Search ............... 720/718, 720/719; 369/283, 286
See application file for complete search history.

(56) References Cited

U.S. PATENT DOCUMENTS

| | | | | |
|---|---|---|---|---|
| 4,879,710 A | * | 11/1989 | Iijima | 369/291 |
| 4,956,213 A | * | 9/1990 | Masuda | 428/64.4 |
| 5,132,152 A | * | 7/1992 | Gotoh et al. | 428/65.1 |
| 5,279,689 A | * | 1/1994 | Shvartsman | 156/220 |
| 5,313,452 A | * | 5/1994 | Usami et al. | 369/275.1 |
| 5,770,348 A | * | 6/1998 | Kondo | 430/321 |
| 5,828,519 A | * | 10/1998 | Sasa | 360/99.12 |
| 6,019,863 A | * | 2/2000 | Irie et al. | 156/182 |
| 6,249,509 B1 | * | 6/2001 | Hirata et al. | 369/275.5 |
| 6,262,969 B1 | * | 7/2001 | Ito et al. | 369/291 |
| 6,319,581 B1 | * | 11/2001 | Tamura | 428/64.1 |
| 6,353,592 B1 | * | 3/2002 | Kashiwagi et al. | 369/283 |
| 6,507,559 B1 | * | 1/2003 | Iwaki | 369/275.5 |
| 6,538,983 B1 | * | 3/2003 | Satoh | 369/286 |
| 6,635,896 B1 | * | 10/2003 | Hirono et al. | 250/559.4 |
| 6,889,381 B2 | * | 5/2005 | Kikuchi et al. | 720/718 |
| 2002/0085482 A1 | * | 7/2002 | Kikuchi et al. | 369/275.1 |

* cited by examiner

FOREIGN PATENT DOCUMENTS

JP    11025510 A  *  1/1999

*Primary Examiner*—William J. Klimowicz
(74) *Attorney, Agent, or Firm*—Sonnenschein Nath & Rosenthal LLP

(57) ABSTRACT

In an optical disc, an information signal area on which an information signal can be recorded and/or reproduced is formed on a major surface of a disc substrate thereof; a light transmitting layer which can transmit a laser beam used in a process for recording and/or reproducing the information signal is formed on a side on which the information signal area is present; and a clamp reference plane is arranged on a major surface of the light transmitting layer in a clamp region. If the optical disc is clamped by a chucking unit of a drive, it is clamped by making the clamp reference plane on the major surface of the light transmitting layer contact with a mounting surface of a table for mounting the disc, and making a magnetic metal plate contact with the major surface of the disc substrate, and then sandwiching the optical disc between.

15 Claims, 6 Drawing Sheets

OPTICAL RECORDING MEDIUM AND METHOD OF MANUFACTURING THE SAME

CROSS REFERENCE TO RELATED APPLICATIONS

This is a continuation of U.S. application Ser. No. 09/971,180, filed on Oct. 4, 2001 now U.S. Pat. No. 6,889,381, which is based on Japanese Priority Document JP 2000-307201, filed in the Japanese Patent Office on Oct. 6, 2000, the entire contents of which are being incorporated herein by reference to the extent permitted by law.

BACKGROUND OF THE INVENTION

1. Field of the Invention

The present invention relates to an optical recording medium and a method of manufacturing such optical recording medium. More particularly, the present invention is preferable for an application to an optical recording medium on and from which an information signal is recorded and/or reproduced, by radiating a laser beam from a side on which a light transmitting layer is formed, to an optical disc having a recording layer and a light transmitting layer formed on a substrate.

2. Description of the Related Art

In recent years, various researches and developments with regard to an optical information recording method have been promoted in a field of information recording. This optical information recording method has merits that a recording operation and/or a reproducing operation can be done without any direct contact to a medium, and that it is possible to attain a recording density higher by one digit or more than that of a magnetically recording method. Also, this optical information recording method has a further merit that it can be applied to respective memory forms such as a read only type, a write once type (recordable type), a rewritable type and the like. For this reason, the applications to wide services from industrial use to consumer use are considered as a method which can attain a file that is low in cost and large in capacity.

Among them, a digital audio disc (DAD), an optical video disc and the like, which are the optical discs corresponding to the memory form of the reproduction only type, are widely prevalent, in particular.

The optical disc such as the DAD or the like has the configuration that a reflection film constituted by a metallic thin film, such as an aluminum (Al) film and the like, is formed on a transparent disc substrate on which concave and convex patterns such as a pit and a groove indicating an information signal and the like are formed, and that a protective film for protecting the reflection film from water ($H_2O$) and oxygen ($O_2$) in the air is formed on the reflection film. And, when the information signal is reproduced from the optical disc, a reproducing light such as a laser beam or the like is radiated to the concave and convex patterns from the optical disc substrate side. Accordingly, the information signal is detected on the basis of a reflectance difference between an incident (incoming) light and a reflected light of the reproducing light.

When such an optical disc is manufactured, an optical disc substrate having concave and convex patterns is firstly fabricated by an injection molding method. Next, a reflection film constituted by a metallic thin film is formed on the optical disc substrate by a vacuum evaporation method. Subsequently, a film formed by coating of an ultraviolet curable resin on an upper layer of the reflection film is used as the protective film.

Here, in the above-mentioned method of recording the optical information, the higher recording density has been requested in recent years. So, in order to satisfy the request of the higher recording density, a technique is proposed for increasing a numerical aperture (NA) of an objective lens used at a time of a radiation of a reproducing light of an optical pickup and thereby reducing a spot diameter of the reproducing light.

That is, NA of an objective lens used at a time of a reproducing a conventional DAD, that is, reading information recorded in the conventional DAD, is 0.45. On the contrary, NA of an objective lens used at a time of reproducing an optical video disc such as a DVD (Digital Versatile Disc) having a recording capacity equal to 6 to 8 times that of the DAD is about 0.60. In this way, it is possible to reduce the spot diameter.

However, if a higher NA is advanced in such an objective lens, it is necessary to thin a disc substrate in an optical recording medium, in order to transmit the radiated reproducing light. This is because an allowable amount of an angle (a tilt angle) deviated from a vertical portion of a disc plane with respect to an optical axis of the optical pickup is dropped, and the tilt angle easily receives the influence of double refraction and aberration caused by a thickness of the disc substrate. Thus, trying to have a thinner disc substrate results in a tilt angle to be as small as possible. For example, in the above-mentioned DAD, the thickness of the disc substrate is set at about 1.2 mm. On the contrary, in the optical video disc having the recording capacity equal to 6 to 8 times that of the recording capacity of the DAD, such as the DVD or the like, the thickness of the disc substrate is set at about 0.6 mm.

However, in consideration of a request for the further higher recording density in future, it is necessary to further reduce the thickness of the disc substrate. So, there is proposed an optical recording medium in which concave and convex portions are formed on a major surface of a disc substrate, as an information signal area; a reflection film and a light transmitting layer of a thin film to transmit a light on the information signal area are sequentially laminated; and a reproducing light from the light transmitting layer side is radiated to the disc substrate so as to reproduce an information signal. Such an optical recording medium can cope with the higher NA of the objective lens by reducing the thickness of the light transmitting layer.

One example of the optical recording medium designed to reproduce the information signal by radiating the reproducing light from the light transmitting layer side is disclosed in Japanese Patent Application Laid-Open No. Hei 10-283683. In this application, when a light transmitting layer is formed, a method is employed for laminating light transmitting sheets on a disc substrate by using an ultraviolet curable resin.

According to the disclosure of the above-mentioned Japanese Patent Application Laid-Open No. Hei 10-283683, the ultraviolet curable resin is firstly fed onto a major surface of a disc substrate. The light transmitting sheet configured so that a laser beam can be transmitted therethrough is placed on the ultraviolet curable resin. Next, the ultraviolet curable resin is filled between the substrate and the light transmitting sheet by rotating in an in-plane direction the light transmitting sheet and the substrate laminated having the ultraviolet curable resin disposed therebetween. At a stage when the ultraviolet curable resin is sufficiently filled between the substrate and the light transmitting layer, the ultraviolet is radiated onto the resin, and the resin is cured. Accordingly, the substrate and the light transmitting sheet are adhered to each other. As mentioned above, the light transmitting layer which comprises the ultraviolet curable resin and the light transmitting sheet is formed.

In the above-mentioned optical disc, various experiments and considerations have been progressed for practical use. However, as a result of the various experiments by the inventor with regard to such an optical recording medium, it is confirmed, in the above-mentioned conventional optical disc, that when the optical disc is chucked and rotated at a predetermined rotation speed, a deflection (run out) of the disc becomes very large. In the present specification, the term "deflection" is used for express the phenomenon of vertical deviation, run-out or the like of the disc surface.

Such a deflection brings about a recording defect and a reproduction defect, in a case of an optical recording medium which has a higher NA of the objective lens of the optical system and a shorter wave length of the laser beam used in the recording and/or the reproduction. For this reason, it results in a severe problem in a practical application of the optical recording medium having the improved recording density.

There is a need for an optical recording medium having a light transmitting layer formed on a disc substrate thereof, which has less deflection and on which a recording operation and/or a reproducing operation can be excellently carried out, and a method of manufacturing the same.

SUMMARY OF THE INVENTION

According to a first aspect of the present invention, there is provided an optical recording medium in which an information signal area on and from which an information signal can be recorded and/or reproduced is formed on a major surface of a disc substrate, and a light transmitting layer which can transmit a laser beam used in a process for recording and/or reproducing the information signal is formed on a side on which the information signal area exists. In the optical recording medium, a clamp reference plane is arranged in a portion on a major surface of the light transmitting layer.

According to a second aspect of the present invention, there is provided a method of manufacturing an optical recording medium, in which an information signal area on and from which an information signal can be recorded and/or reproduced is formed on a major surface of a disc substrate, and a light transmitting layer which can transmit a laser beam used in a process for recording and/or reproducing the information signal is formed on a side on which the information signal area exists. In the method, a clamp reference plane can be arranged on a major surface of the light transmitting layer in a clamp region of the optical recording medium.

In the present invention, typically, the light transmitting layer of the optical recording medium comprises a light transmitting sheet and an adhesive layer disposed between the light transmitting sheet and a major surface of the substrate to adhere them, and the method includes a step of laminating the light transmitting sheet on a major surface of the disc substrate via the adhesive layer disposed therebetween.

In the present invention, typically, the light transmitting layer of the optical recording medium comprises a light transmitting sheet; an adhesive layer through which the light transmitting sheet is adhered to a major surface of the substrate; and a protective layer formed on a plane opposite to a side on which the adhesive layer of the light transmitting sheet is formed, and the manufacturing method may include a step of laminating the light transmitting sheet on a major surface of the disc substrate through the adhesive layer disposed therebetween.

In the present invention, typically, the clamp reference plane has an annular shape. Preferably, a diameter of the innermost circumference of the clamp reference plane is 22 mm or more and 24 mm or less, and a diameter of the outermost circumference of the clamp reference plane is 32 mm or more and 34 mm or less. More preferably, the diameter of the innermost circumference of the clamp reference plane is 22.5 mm or more and 23.5 mm or less, and the diameter of the outermost circumference of the clamp reference plane is 32.5 mm or more and 33.5 mm or less.

In the present invention, typically, the disc substrate has a flat annular shape having a first opening at a center portion thereof, and the light transmitting layer has a flat annular shape having a second opening at a center portion thereof, and a diameter of the second opening is larger than a diameter of the first opening and smaller than an inner circumference diameter of the clamp region in the disc substrate.

In the present invention, typically, the light transmitting layer comprises the light transmitting sheet and the adhesive layer through which the light transmitting sheet is adhered to a major surface of the substrate. Then, the light transmitting layer is formed on a major surface of the disc substrate, by using a step of laminating the light transmitting sheet onto the major surface of the disc substrate through the adhesive layer therebetween. At this time, preferably, the adhesive layer is made of a pressure-sensitive adhesive or an ultraviolet curable resin. However, other adhesive materials and adhesive resins can also be used.

In the present invention, typically, a sum of a thickness of the disc substrate in the clamp region and a film thickness of the light transmitting layer is 1.0 mm or more and 1.4 mm or less. Preferably, the sum is 1.1 mm or more and 1.3 mm or less.

In the present invention, typically, a film thickness of the light transmitting layer is 90 μm or more and 110 μm or less. Preferably, the film thickness is 95 μm or more and 105 μm or less.

In the present invention, typically, the disc substrate has a flat annular shape, and the light transmitting sheet also has a flat annular shape. So, in the present invention, in order to form the light transmitting layer having the light transmitting sheet, typically, after the adhesive resin is coated on the disc substrate, the light transmitting sheet is placed on the disc substrate via the adhesive resin disposed therebetween. Also, in the present invention, in order to prevent the light transmitting sheet from being peeled off from the disc substrate after the adhesive resin is cured, preferably, the inner diameter of the sheet having the flat annular shape is configured to be larger than the inner diameter of the substrate having the flat annular shape, and the outer diameter of the sheet having the flat annular shape is configured to be smaller than the outer diameter of the substrate having the flat annular shape. Also, in the present invention, in order to fill the adhesive resin between the substrate and the light transmitting sheet without any space, preferably, after the sheet is placed on the substrate through the adhesive resin disposed therebetween, the substrate and the light transmitting sheet are rotated around the axis of the center in the flat annular shape, vertically to the plane of the flat annular shape. Since the sheet and the substrate are rotated while having the adhesive resin therebetween as mentioned above, the adhesive resin can be filled between the substrate and the sheet with no space therein.

In the present invention, typically, the adhesive layer is made of the pressure-sensitive adhesive and the ultraviolet curable resin cured by the radiation of the ultraviolet. However, it is possible to use other adhesives, in specific, adhesives such as a cyano-acrylate type adhesive, an epoxy type adhesive, a polyurethane type adhesive, a hot melt adhesive and the like, and an epoxy resin, a melamine resin, or an alkyd resin. That is, any resin can be used if it is a resin cured by the radiation of light such as an electron beam, ultraviolet and the like, or a predetermined method such as a heating operation and the like. Among the ultraviolet curable resins, acrylate type, thiol type, epoxy type and silicon type ultraviolet curable resins can be used. So, if an ultraviolet curable adhesive is used as the material of the adhesive layer, the adhesive layer is typically cured by radiating the ultraviolet onto at least the above-mentioned adhesive layer. In the present invention, preferably, the adhesive layer is cured by radiating the ultraviolet onto at least the adhesive layer from the side opposite to the side on which the adhesive layer is formed with respect to the light transmitting layer. Moreover, in the present invention, the curing method which is suitable for the material selected as the material of the adhesive layer is selected.

In the present invention, in order to minimize distortion and warp in the optical recording medium to be manufactured, the light transmitting sheet is preferably made of the same kind of material as a material used for the substrate. The thickness of the light transmitting sheet is typically configured so as to be less than a thickness of the disc substrate. In the present invention, the thickness of the light transmitting sheet is specifically selected from a range between 90 µm and 110 µm. Moreover, in the present invention, the substrate and the light transmitting sheet are typically made of a thermoplastic resin having a light transmitting property. In specific, a resin of low water absorption, for example, such as polycarbonate (PC), cyclo-olefin-polymer and the like is used. By the way, as for the disc substrate, for example, a substrate made of a metal such as Al and the like, a glass substrate, or a disc substrate made of a resin such as polyolefin, polyimide, polyamide, polyphenylene sulfide, polyethylene terephthalate and the like can be used.

In the present invention, the light transmitting sheet is made of a non-magnetic material that allows the transmission of a laser beam radiated from a GaN semiconductor laser (a light emission wave length of 400 nm bandwidth, blue light emission), a ZnSe semiconductor laser (a light emission wave length of 500 nm bandwidth, green) or an AlGaInP semiconductor laser (a light emission wave length of about 635 to 680 nm, red) or the like, which is used in a process for recording/reproducing at least an information signal. In specific, it is made of a thermoplastic resin having a light transmitting property, such as polycarbonate and the like.

Preferably, the present invention can be applied to an optical recording medium having a light transmitting layer, such as DVR (Digital Video Recording System) and the like, which is configured so as to record information by using the objective lens having an NA increased to as high as 0.85, which is realized by the series combination of two lenses. In specific, the present invention can be applied to an optical recording medium, such as a so-called DVR-red that uses a semiconductor laser having a light emission wave length of about 650 nm, a so-called DVR-blue that uses a semiconductor laser having a light emission wave length of about 400 nm, and the like.

In the optical recording medium having the above-mentioned configuration according to the present invention and the method of manufacturing the same, the clamp reference plane is defined in the portion on the major surface of the light transmitting layer. Thus, even if a foreign body is sandwiched between the clamp reference plane and a fixing jig when the optical recording medium is chucked, the foreign body can be embedded in the light transmitting layer.

As explained above, according to the present invention, in the optical recording medium in which the information signal are configured to be capable of recording and/or reproducing an information signal is formed on a major surface of the disc substrate, and the light transmitting layer configured to be capable of transmitting therethtough the laser beam used in the process for recording and/or reproducing the information signal is formed on the side on which the information signal area is present, the clamp reference plane is defined in the portion on a major surface of the light transmitting layer. So, even if a foreign body is sandwiched between the clamp reference plane and the clamping unit (fixing jig) when the optical recording medium is chucked, the foreign body can be put so as to be embedded in the light transmitting layer. Thus, the flatness of the clamp reference plane can be maintained to thereby reduce the deflection on the optical recording medium as a final product. Hence, it is possible to attain the optical recording medium with less deflection and flutter, and being excellent in recording/reproducing performance.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DETAILED DESCRIPTION OF THE PREFERRED EMBODIMENTS

Figure 1:
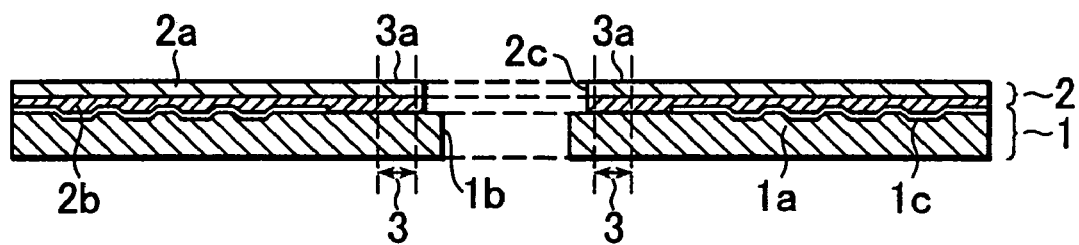
FIG. 1 is a cross sectional view showing an optical disc according to a first embodiment of the present invention.

Embodiments of the present invention will be described below with reference to the attached drawings. By the way, in all the drawings of the following embodiments, the same reference numerals are given to the same or corresponding portions.

At first, an optical disc according to a first embodiment of the present invention is described. FIG. 1 shows the optical disc according to the first embodiment.

As shown in FIG. 1, in the optical disc according to the first embodiment, a disc substrate 1 is configured such that a center hole 1b is formed at a center of a replica substrate 1a and an information signal area 1c is formed on a major surface on which concave and convex portions are formed. Also, a light transmitting layer 2 is formed on the disc substrate 1. The light transmitting layer 2 comprises a light transmitting sheet 2a and an adhesive layer 2b. The adhesive layer 2b is disposed between the light transmitting sheet 2a and the disc substrate 1 so as to adhere them. A penetration hole 2c is made at a center portion thereof. Here, a diameter of the penetration hole 2c is equal to or greater than a diameter of the center hole 1b, in consideration of the fact that the light transmitting sheet 2a is adhered onto the disc substrate 1 through the adhesive layer 2b. In specific, for example, the diameter of the penetration hole 2c is 15 mm or more.

Also, a clamp region 3 is annually arranged around the penetration hole 2c on the major surface of the light transmitting sheet 2a side of the light transmitting layer 2. A clamp reference plane 3a used when the optical disc is placed in a spindle of a recording/reproducing apparatus (both are not shown) is defined on the major surface on a side of the light transmitting sheet 2a of the light transmitting layer 2 within the clamp region 3. Here, an innermost circumference diameter of the annular clamp region 3 is selected from 22 to 24 mm. In the first embodiment, for example, the inner diameter is selected to be 23 mm. Also, an outermost circumference diameter of the clamp region 3 is selected from 32 to 34 mm. In the first embodiment, for example, the outer diameter is selected to be 33 mm. By the way, in consideration of the fact that the clamp reference plane 3a is constituted by the major surface of the light transmitting sheet 2a side of the light transmitting layer 2, the diameter of the penetration hole 2c is selected as a length equal to or less than the innermost circumference diameter of the clamp region 3. In specific, for example, the diameter of the penetration hole 2c is selected to be 22 mm or less.

The method of manufacturing the optical disc according to the first embodiment having the above-mentioned configuration will be described below.

Figure 2:
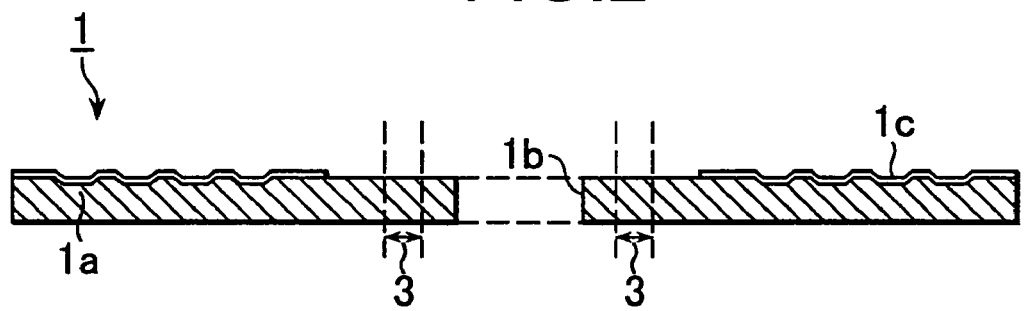
FIG. 2 is a cross sectional view showing a disc substrate according to the first embodiment of the present invention.

At first, the disc substrate 1 according to the first embodiment is manufactured as shown in FIG. 2. That is, the replica substrate 1a is fabricated by an injection molding method using a predetermined stamper. A thickness of the replica substrate 1a is, for example, 0.6 to 1.2 mm. Also, as a material of the replica substrate 1a, a resin of low water absorption, such as polycarbonate, cyclo-olefin-polymer (for example, ZEONEX (registered trademark of Zeon Corporation, Japan)) and the like is used, for example. By the way, as the replica substrate 1a, for example, a substrate made of a metal such as Al and the like, a glass substrate, or a substrate made of a resin such as polyolefin, polyimide, polyamide, poly-phenylene sulfide, polyethylene terephthalate and the like may be used. Also, a recording film, a reflection film and the like are formed on concave and convex portions formed on a major surface of the replica substrate 1a, and the information signal area 1c is constituted by them. The information signal area 1c may comprise a reflection film, a film made of a magneto-optical material, a film made of a phase change material, an organic dye film and the like. Among the films, as a material of the reflection film, Al is used, for example. In specific, when an optical disc as a final product is an optical disc for read only (ROM (Read Only Memory)), the information signal area 1c comprises a single-layer film or a laminated film at least having reflection a film made of, for example, Al or the like. On the other hand, if the optical disc as the final product is a rewritable type optical disc, the information signal area 1c comprises a single-layer film or a laminated film at least having a film made of magneto-optical material such as a TbFeCo type alloy, a TbFeCoSi type alloy, a TbFeCoCr type alloy or the like, or a film made of a phase change material such as a GeInSbTe alloy and the like. Also, if the optical disc as the final product is a write once type optical disc, the information signal area 1c comprises a single-layer film or a laminated film at least having a film made of a phase change material such as a GeTe type material and the like, or a film made of an organic dye material.

Here, the replica substrate 1a according to the first embodiment is constituted by, for example, a disc-shaped polycarbonate (PC) substrate having a thickness of 1.1 mm. A diameter, that is, an outer diameter of the replica substrate 1a is, for example, 120 mm, and an opening diameter, that is, an inner diameter of the center hole 1b is, for example, 15 mm. Also, as an example of the information signal area 1c on a major surface of the disc substrate 1, the information signal area 1c is constituted by a laminated film in which a first dielectric layer having a film thickness of 18 nm made of a mixture ($ZnS-SiO_2$) of zinc sulfide (ZnS) and silicon oxide ($SiO_2$), a phase change recording layer having a film thickness of 24 nm made of a GeSbTe alloy layer, and a second dielectric layer having a film thickness of 100 nm made of $ZnS-SiO_2$ are laminated in this sequential order on a reflection layer having a film thickness of 100 nm made of an Al alloy.

Figure 3:
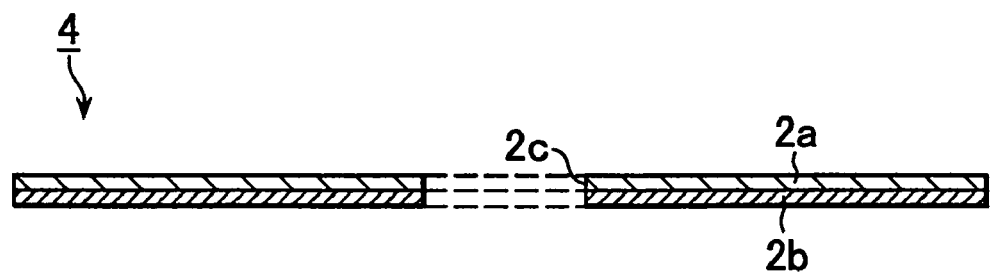
FIG. 3 is a cross sectional view showing a sheet according to the first embodiment of the present invention.

The sheet constituting the light transmitting layer 2 according to the first embodiment will be described below. FIG. 3 shows a sheet 4 constituting the light transmitting layer 2 according to the first embodiment.

As shown in FIG. 3, the sheet 4 used in the first embodiment comprises the light transmitting sheet 2a and the adhesive layer 2b adhered on a surface of the light transmitting sheet 2a. The sheet 4 has a structure formed by stamping flatly and annually, similarly to the disc substrate 1, and the penetration hole 2c is formed at a center portion thereof. Here, as for the size of the light transmitting sheet 2a, a diameter (outer diameter) of the light transmitting sheet 2a is selected to be equal to or less than the outer diameter of the replica substrate 1a, that is, the disc substrate 1. Specifically, for example, the diameter is selected to be 119 mm. A diameter (inner diameter) of the penetration hole 2c is selected to be equal to or greater than the opening diameter of the center hole 1b and also equal to or less than the innermost circumference diameter (for example, a diameter of 25 mm) of the clamp region 3. For example, the inner diameter is selected to be 22 mm. The sheet 4 is made of, for example, a thermoplastic resin which satisfies an optical property of allowing at least the ultraviolet to be transmitted and has a light transmitting property to at least a laser beam used in a recording/reproduction of the optical disc. Specifically, the thermoplastic resin can include, for example, polycarbonate (PC), a methacrylic resin such as poly-methyl-methacrylate (poly-methacrylate methyl) and the like. It is preferable that the same kind of material as the material of the replica substrate 1a is used. Also, a thickness of the light transmitting sheet 2a is selected from 65 to 75 μm. In specific, for example, the thickness is 70 μm. By the way, the thickness of the light transmitting sheet 2a is determined in consideration of the film thickness of the light transmitting layer 2 formed on the optical disc as a final product.

Figure 4:
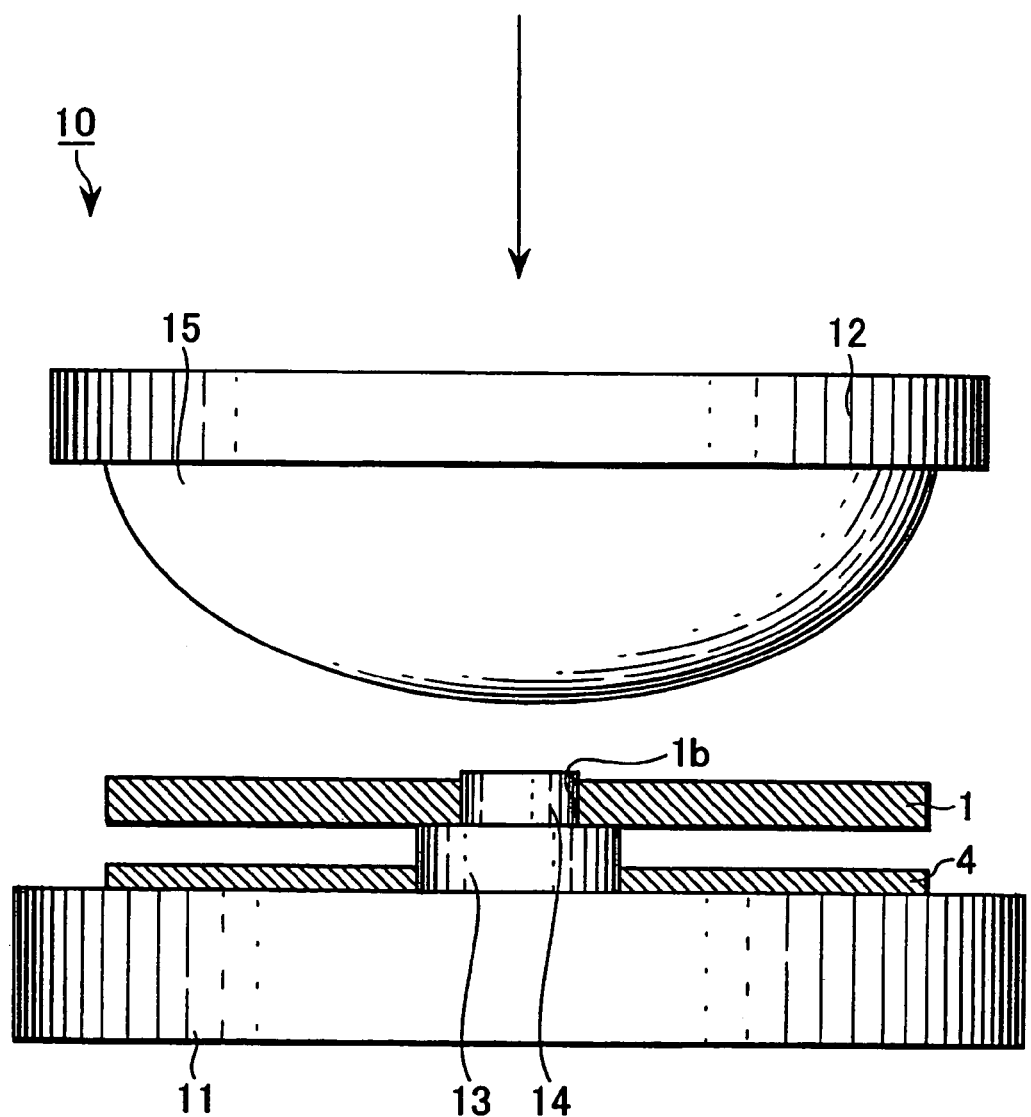
FIG. 4 is a view showing a laminating apparatus used to laminate the disc substrate and the sheet according to the first embodiment of the present invention.

The method of laminating the sheet 4 and the disc substrate 1 according to the first embodiment manufactured as mentioned above will be described below. At first, a laminating apparatus is described which is used in the lamination according to the first embodiment. FIG. 4 shows the laminating apparatus.

As shown in FIG. 4, the laminating apparatus according to the first embodiment is configured such that a fixed stage 11 and a movable stage 12 are placed at positions facing to each other.

The fixed stage 11 is for mounting the sheet 4. A longitudinally movable pin 13 is disposed on the fixed stage 11 at a portion facing to the movable stage 12. The longitudinally movable pin 13 moves upwardly and downwardly, that is, in both directions of protruding from the fixed stage 11 and of drawing back into the fixed stage 11. A diameter of the longitudinally movable pin 13 is designed to be equal to the diameter of the penetration hole 2c of the above-mentioned sheet 4. The sheet 4 can be placed on the fixed stage 11 by engaging the penetration hole 2c of the sheet 4 with the longitudinally movable pin 13. Also, a positioning pin 14 which is cylindrically protruded above the longitudinally movable pin 13 is disposed for positioning the substrate. A diameter of the positioning pin 14 is designed to be substantially equal to a diameter of the center hole 1b of the above-mentioned disc substrate 1. The disc substrate 1 can be supported by the longitudinally movable pin 13 while the center of the disc substrate 1 is matched with the positioning pin 14. The thus-configured fixed stage 11 is designed such that the sheet 4 can be mounted by engaging with the longitudinally movable pin 13 on the fixed stage 11, and the fixed stage 11 can be supported by the longitudinally movable pin 13 by engaging with the positioning pin 14.

A pad 15 made of an elastic body, for example, such as a rubber and the like, is placed on a surface of the portion opposite to the fixed stage 11 of the movable stage 12. The pad 15 has a partially spherical shape composed of one portion when a sphere is divided at a predetermined flat plane, and the pad 15 is fixedly adhered to a plane facing to the fixed stage 11 in the movable stage 12.

A laminating apparatus 10 according to the first embodiment is configured as mentioned above.

Then, the laminating apparatus 10 having the above-mentioned configuration is used to laminate the disc substrate 1 and the sheet 4 to each other. That is, the penetration hole 2c of the sheet 4 is firstly engaged with the longitudinally movable pin 13 so that the sheet 4 is placed on the fixed stage 11. At this time, the sheet 4 is placed such that the side of the adhesive layer 2b is opposed to the movable stage 12.

After that, the disc substrate 1 is placed so as to be supported by the longitudinally movable pin 13 while being engaged with the positioning pin 14. At this time, the disc substrate 1 is placed and supported by the longitudinally movable pin 13 so that the major surface on which the information signal area 1c is formed faces to the adhesive layer 2b.

Next, the movable stage 12 is moved toward the fixed stage 11 (in a downward direction in FIG. 4). First, the pad 15 presses the positioning pin 14. In succession, the pad 15 presses the longitudinally movable pin 14 into the fixed stage 11 via the disc substrate 1. Accordingly, a major surface of the disc substrate 1, on which the information signal area 1c is formed, and the adhesive layer 2b of the sheet 4 are pressed and adhered to each other. After the pressed adhesion becomes stable, the movable stage 12 is released in a direction away from the fixed stage 11. After that, a predetermined carrying apparatus (not shown) is used to take out the disc substrate 1 and the sheet 4 which are pressed and adhered to each other, from the fixed stage 11.

As mentioned above, the light transmitting layer 2 is formed on the disc substrate 1, and the desirable optical disc is manufactured.

Figure 5:
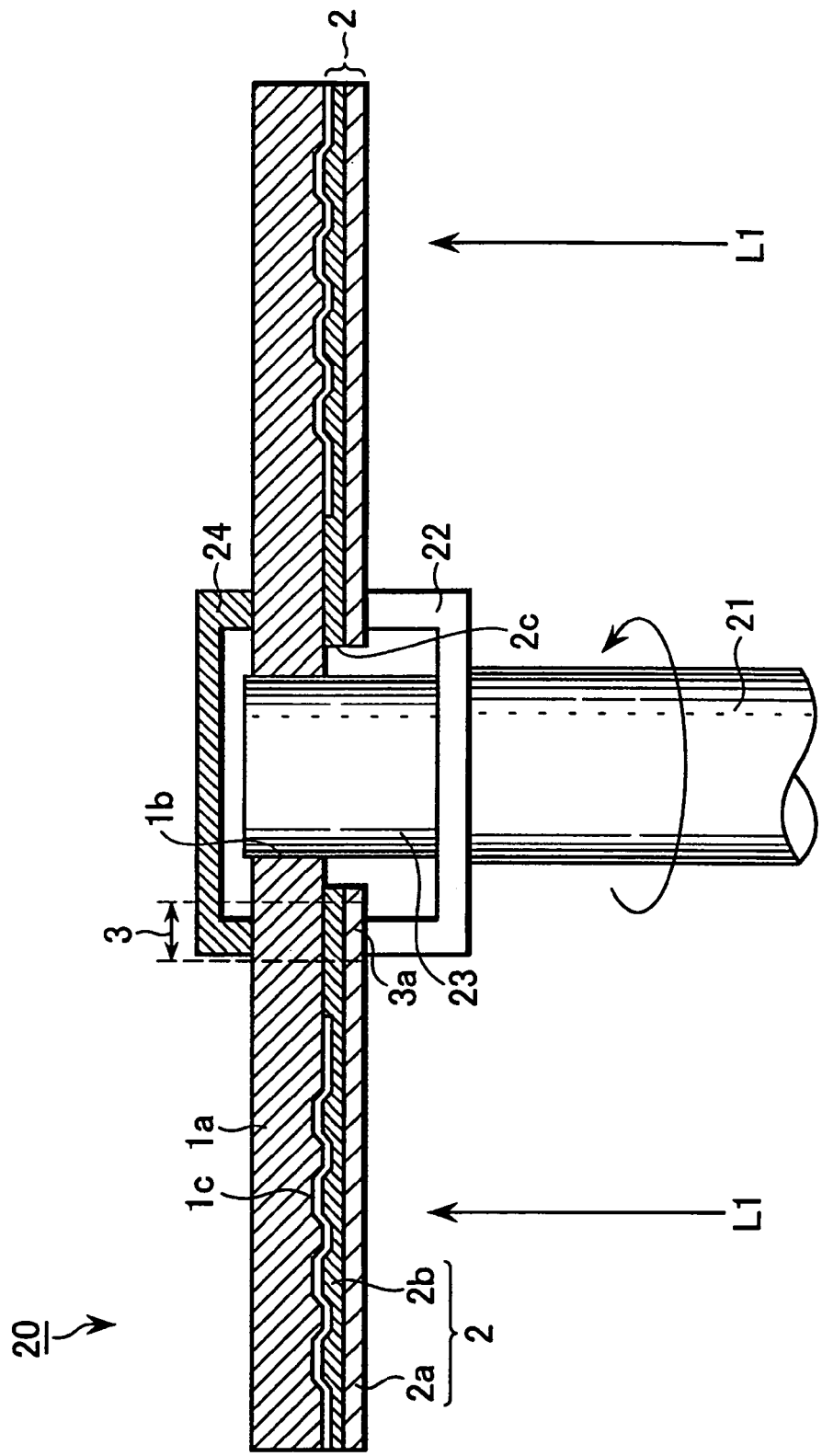
FIG. 5 is a cross sectional view showing a chucking unit for clamping the optical disc according to the first embodiment of the present invention.

A case where the optical disc having the above-mentioned configuration is clamped by a chucking unit will be described below. FIG. 5 shows the chucking unit according to the first embodiment.

As shown in FIG. 5, in a chucking unit 20 according to the first embodiment, a table 22 for mounting the disc, a center positioning pin 23 and a magnetic metal plate 24 are disposed on an upper portion of a rotation shaft 21 while they are sequentially connected to each other.

The rotation shaft 21 is connected to a motor (not shown), and it is designed to rotate on its axis at a center on a section vertical to a longitudinal direction of the rotation shaft 21.

The table 22 is intended to mount the optical disc. The optical disc is mounted in contact with the major surface of the light transmitting layer 2 in the clamp region 3, namely, the clamp reference plane 3a. Also, a top surface of the table 22 on which the optical disc is mounted is annular-shaped. A diameter of its innermost circumference is, for example, 26 mm, and a diameter of its outermost circumference is, for example, 32 mm. A permanent magnet (not shown), for example, is embedded within the table 22. In specific, the permanent magnet is covered with a resin such as a polyimide and the like.

The center positioning pin 23 is used for positioning the center of the optical disc appropriately. Also, the center positioning pin 23 can be inserted into the center hole of the optical disc (the center hole 1b of the disc substrate 1). Its center is designed to substantially coincide with the self-rotation center of the rotation shaft 21.

The magnetic metal plate 24, which is made of a magnetic material, is intended to clamp the optical disc mounted on the table 22 from the side of the disc substrate 1. Here, a cross section along the plane parallel to the mounting plane of the table 22 in the magnetic metal plate 24 is annular-shaped. A diameter of the innermost circumference of this circular shape is, for example, 26 mm, and a diameter of the outermost circumference is, for example, 32 mm.

The chucking unit 20 of the present embodiment is designed such that the optical disc is sandwiched between the table 22 in contact with the side of the light transmitting layer 2 in which the permanent magnet is embedded and the magnetic metal plate 24 in contact with the side of the disc substrate 1, in its clamp region 3, and it is accordingly clamped. Also, a force by which the optical disc is sandwiched between the table 22 and the magnetic metal plate 24, namely, the clamping force is, for example, 2 N.

The chucking unit 20 having the above-mentioned configuration clamps the optical disc. Also, the operation for recording on and reproducing from the information signal area 1*c* is carried out by radiating a laser beam $L_1$ passed through a two-group lens from a semiconductor laser (not shown), from the side of the light transmitting layer 2 of the optical disc to the information signal area 1*c*.

The inventor measured the deflection of the optical disc having the above-mentioned configuration. Namely, at first, the portion of the clamp region 3 of the above-mentioned optical disc was sandwiched between an annular jig having an inner diameter of 25 mm and an outer diameter of 33 mm. Moreover, a weight having a mass of 1 kg was put on the upper portion of the optical disc, and it was placed in the atmosphere having a temperature of 80° C. and a humidity of 85%. By the way, the reason why the weight having the mass of 1 kg was put was that the clamping force of a drive used in an industrial field is usually about 9.8 N (1 kgwt). Then, an acceleration test was carried out for 100 hours, and a variation in the deflection before and after the execution of the acceleration test at the portion of a radius 55 mm in the optical disc was measured. Also, it was assumed that any foreign body was put when the optical disc was clamped by the chucking unit. So, a thin plate (shim) made of stainless steel was used. Then, the variation of the deflection was similarly measured even for a case where a shim having a thickness of 30 μm and a shim having a thickness of 50 μm are respectively sandwiched between the jig and the optical disc. A table 1 shows the result.

TABLE 1

| CLAMP REFERENCE PLANE | Shim of 30 μm | Shim of 50 μm | No Shim |
|---|---|---|---|
| LIGHT TRANSMITTING LAYER | 8.3 μm | 9.1 μm | 9.1 μm |
| DISC SUBSTRATE | 24.7 μm | 28.8 μm | 26.1 μm |

From the table 1, it is understood that the variation in the deflection when the clamp reference plane 3*a* of the optical disc was defined on a major surface of the light transmitting layer 2, such as the optical disc according to the first embodiment, was reduced to about ⅓ as compared with the variation in the deflection of a case where a clamp reference plane of the optical disc was arranged on a major surface of the disc substrate 1, such as the conventional optical disc. Thus, it is understood that the variation in the deflection is reduced by setting the clamp reference plane of the optical disc on a major surface of the light transmitting layer. Hence, it is understood that the occurrence of the deflection can be suppressed.

From a viewpoint of the inventor, if a flaw occurs in the clamp region (especially, the clamp reference plane) of the optical disc, the deflection is brought about when the optical disc is again clamped by the chucking unit of a recording/reproducing apparatus, a reproduction only apparatus or the like. That is, according to the consideration by the inventor, the flaw such as a depression, a projection and the like caused by a foreign body such as a shim becomes large in the conventional optical disc in which the clamp reference plane is constituted by a major surface of the disc substrate. In particular, the projection causes the variation in the deflection to be severe. On the contrary, in the optical disc according to the first embodiment in which the clamp reference plane is constituted by a major surface of the light transmitting layer, even if somewhat foreign body such as the shim and the like is put, the existence of the light transmitting sheet 2*a* of 100 μm or less enables the foreign body to be embedded in the light transmitting layer 2. Thus, the occurrence of the projection can be avoided to thereby suppress the occurrence of the deflection. So, the occurrence of the projection on the clamp reference plane can be suppressed to thereby maintain the flatness on the clamp reference plane.

As mentioned above, according to the first embodiment, in the optical disc in which the light transmitting layer 2 is formed on the disc substrate 1, the clamp reference plane 3*a* of the clamp region 3 is constituted by a major surface of the light transmitting layer 2. Thus, in a case of the optical disc being inserted into a recording/reproducing apparatus or a reproduction only apparatus, even if a foreign body is sandwiched between the clamp reference plane 3*a* and the clamping unit, the foreign material can be embedded in the light transmitting layer 2 to accordingly maintain the flatness of the clamp reference plane 3*a*. So, the deflection at the time of the rotation of the optical disc can be suppressed to thereby improve the recording/reproducing characteristic. Hence, it is possible to attain the optical recording medium having an excellent recording and/or reproducing characteristic and the high reliability.

Figure 6:
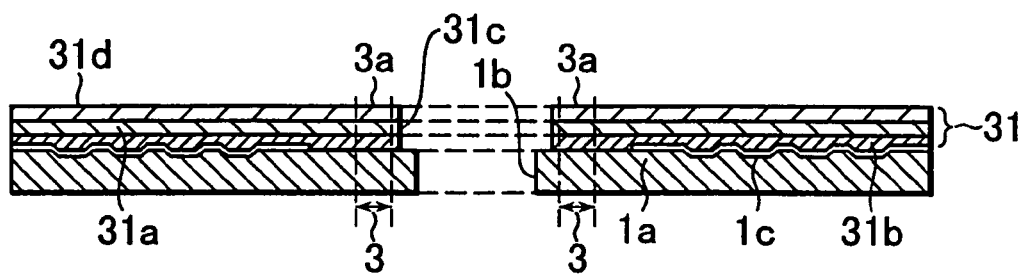
FIG. 6 is a cross sectional view showing an optical disc according to a second embodiment of the present invention.
Figure 7:
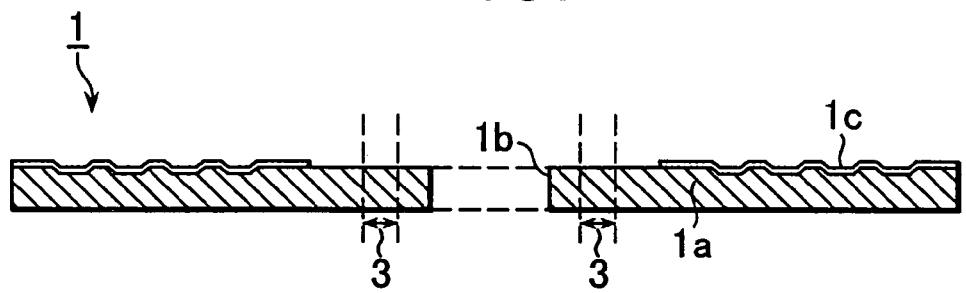
FIG. 7 is a cross sectional view showing a disc substrate according to the second embodiment of the present invention.

An optical disc according to a second embodiment of the present invention will be described below. FIG. 6 shows the optical disc according to the second embodiment. FIG. 7 shows a disc substrate 1 according to the second embodiment.

As shown in FIGS. 6 and 7, in the optical disc according to the second embodiment, the disc substrate 1 is constituted similarly to that of the first embodiment. A light transmitting layer 31 is formed on the disc substrate 1. The light transmitting layer 31 comprises a light transmitting sheet 31*a* which is adhered to the disc substrate 1 via an adhesive layer 31*b* disposed therebetween, and a hard coat layer 31*d* which is formed on a plane opposite to a side on which the adhesive layer 31*b* of the light transmitting sheet 31*a* is formed. Also, in the light transmitting layer 31, a penetration hole 31*c* is made at a center portion thereof. A diameter of the penetration hole 31*c* is similar to that of the light transmitting layer 2 in the first embodiment.

A clamp region 3 is annually provided around a center hole 1*b* of the disc substrate 1 and the penetration hole 31*c* in the light transmitting layer 31. A clamp reference plane 3*a* when the optical disc is placed in a spindle of a recording/reproducing apparatus (both are not shown) is defined on a major surface of the side of the hard coat layer 31*d* of the light transmitting layer 31 in the clamp region 3. Here, the diameters of the innermost circumference and the outermost circumference of the annular clamp region 3 are similar to those of the first embodiment.

Figure 8:
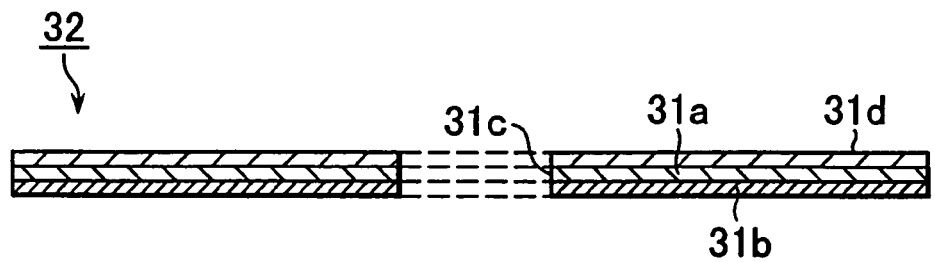
FIG. 8 is a cross sectional view showing a sheet according to the second embodiment of the present invention.

A sheet constituting the light transmitting layer 31 according to the second embodiment will be described below. FIG. 8 shows a sheet 32 constituting the light transmitting layer 31 according to the second embodiment.

As shown in FIG. 8, the sheet 32 used in the second embodiment comprises the light transmitting sheet 31*a*; the adhesive layer 31*b* made of an adhesive adhered on a major surface of the light transmitting sheet 31*a*; and the hard coat layer 31*d* made of, for example, an ultraviolet curable resin and the like, which is formed on the other major surface opposite to the side where the adhesive layer 31*b* of the light transmitting sheet 31*a* is formed. A thickness of the light transmitting sheet 2a is selected, for example, from a range between 65 and 75 μm. In the second embodiment, the light transmitting sheet 2a has a thickness of 65 μm, for example. Also, a thickness of the adhesive layer 31b is selected, for example, from a range between 25 and 35 μm. In the second embodiment, the adhesive layer 31b has a thickness of 30 μm, for example. By the way, the thickness of the light transmitting sheet 31a and the thickness of the adhesive layer 31b are determined by considering a film thickness of the light transmitting layer 31 to be finally formed. By the way, the other requirements for the sheet 32 according to the second embodiment are similar to those of the first embodiment.

Also, the method of laminating the disc substrate 1 and the sheet 32 according to the second embodiment and the method of clamping the optical disc in the chucking unit are similar to those of the first embodiment. So, their explanations are omitted.

As mentioned above, according to the second embodiment, the clamp reference plane 3a is arranged on the major surface of the side of the hard coat layer 31d of the light transmitting layer 31 in the clamp region 3. Thus, it is possible to obtain the effect similar to that of the first embodiment.

Figure 9:
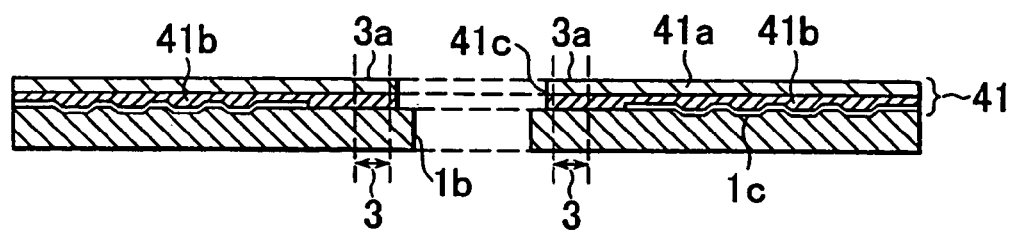
FIG. 9 is a cross sectional view showing an optical disc according to a third embodiment of the present invention.
Figure 10:
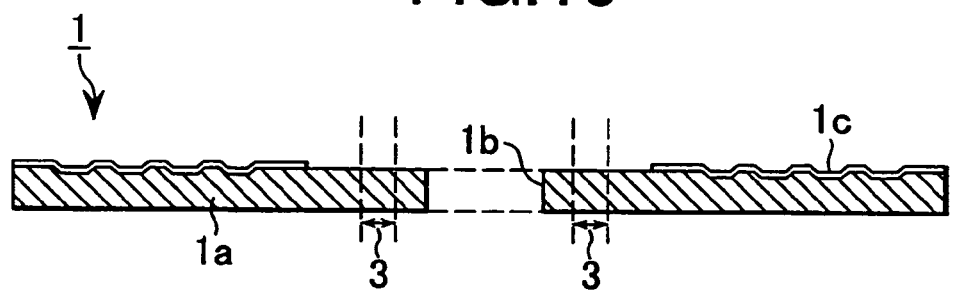
FIG. 10 is a cross sectional view showing a disc substrate according to the third embodiment of the present invention.

An optical disc according to a third embodiment of the present invention will be described below. FIG. 9 shows the optical disc according to the third embodiment. FIG. 10 shows a disc substrate. And, FIG. 11 shows a light transmitting sheet.

As shown in FIG. 9, the optical disc according to the third embodiment is configured such that a light transmitting layer 41 which comprises a light transmitting sheet 41a and an adhesive layer 41b is formed on a major surface of the disc substrate 1 on which the information signal area 1c is formed. By the way, the disc substrate 1 according to the third embodiment is similar to the disc substrate in the first embodiment, as shown in FIG. 10.

Figure 11:
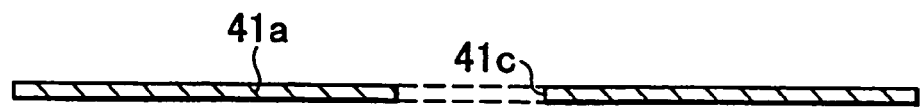
FIG. 11 is a sectional view showing a light transmitting sheet according to the third embodiment of the present invention.

As shown in FIG. 11, the sheet used in the third embodiment comprises the light transmitting sheet 41a. The light transmitting sheet 41a has a structure formed by punching flatly and annually, similarly to the disc substrate 1, and a penetration hole 41c is formed at a center portion thereof. Here, as the size of the light transmitting sheet 41a, a diameter (outer diameter) is less than the outer diameter of the replica substrate 1a (for example, 120 mm). For example, in this case, the diameter o the light transmitting sheet 41a is 119 mm. A diameter of the penetration hole 41c, that is, an inner diameter of the sheets is equal to or greater than the open diameter of the center hole 1b (actually, for example, 15 mm or more) and also equal to or less than the inner circumference diameter of the clamp region. Specifically, for example, the diameter of the penetration hole 41c is set at 22 mm.

Also, the light transmitting sheet 41a is made of, for example, a thermoplastic resin having the light transmitting characteristic which satisfies the optical property that allows at least ultraviolet to be transmitted. The thermoplastic resin can specifically include, for example, polycarbonate (PC) or methacrylic resin such as poly-methyl-methacrylate (poly-methacrylate methyl) and the like. Also, in the third embodiment, a thickness of the light transmitting sheet 41a is, for example, 95 μm. By the way, the thickness of the light transmitting sheet 41a is determined in consideration of the film thickness of the light transmitting layer 41 to be finally formed.

The method of manufacturing the optical disc according to the third embodiment will be described below. At first, since the method of manufacturing the disc substrate 1 according to the third embodiment is similar to that of the first embodiment, its explanation is omitted.

The method of forming the light transmitting layer 41 on the disc substrate 1 will be described below. FIGS. 12A, 12B, 12C and 12D show the process for forming the light transmitting layer 41 according to the third embodiment.

Figure 12A:
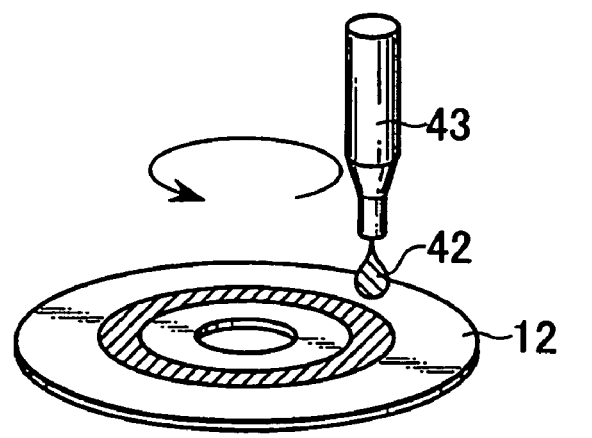
FIG. 12A to FIG. 12D are perspective views each showing a process for forming a light transmitting layer according to the third embodiment of the present invention.

At first, as shown in FIG. 12A, an ultraviolet curable resin 42 is fed and coated on a major surface on which the information signal area 1c of the disc substrate 1 is formed. The feeding of the ultraviolet curable resin 42 is carried out from a nozzle port of an ultraviolet curable resin feeding unit 43 to the side of the inner circumference on a major surface of the disc substrate 1 so as to have a flat and annular shape, for example. At this time, the disc substrate 1 and the ultraviolet curable resin feeding unit 43 for injecting the ultraviolet curable resin 42 are relatively rotated. At this time, an ultraviolet curable resin having a viscosity of, for example, 0.1 Pa·s (100 cps) is used for the ultraviolet curable resin.

Figure 12B:
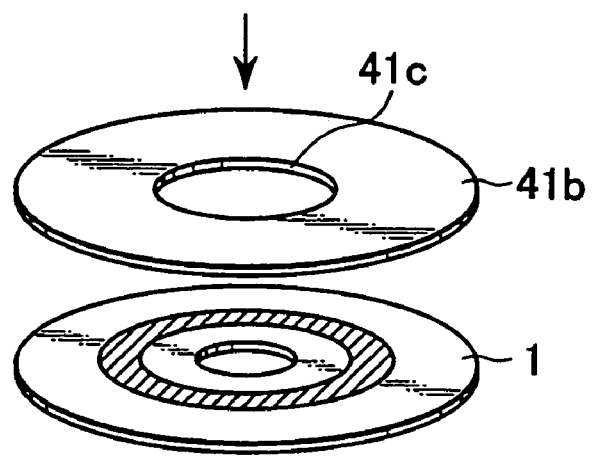

As shown in FIG. 12B, a position of the center hole 1b of the disc substrate 1 and a position of the penetration hole 41c of the center of the light transmitting sheet 41a are matched with each other. Then, the flat and annular light transmitting sheet 41a is placed on the major surface of the disc substrate 1 to which the ultraviolet curable resin 42 is fed.

Figure 12C:
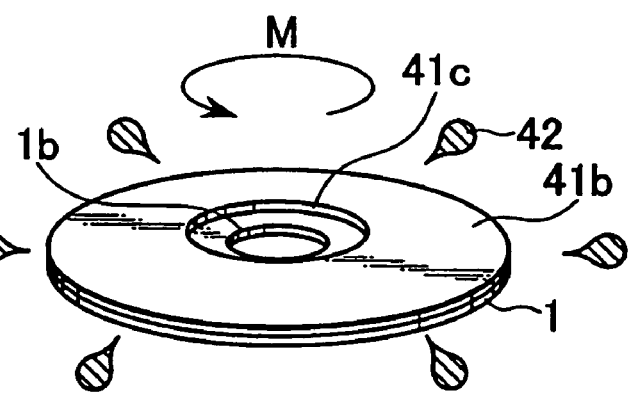

Next, as shown in FIG. 12C, the disc substrate 1 and the light transmitting sheet 41a are rotated in an in-plane direction (a direction of M in FIG. 12C) with a rotation axis as a center. Accordingly, the ultraviolet curable resin 42 on the disc substrate 1 is filled between the disc substrate 1 and the light transmitting sheet 41a. Also, the excessive ultraviolet curable resin 42 is spun off. Here, the rotation speed of the disc substrate 1 and the light transmitting sheet 41a is, for example, 83.3 s$^{-1}$ (5000 rpm), and a rotational time is, for example, 20 s. By the way, if the protective layer (not shown) made of the ultraviolet curable resin 42 is formed by feeding the ultraviolet curable resin 42 to the plane opposite to the side on which the light transmitting sheet 41a of the disc substrate 1 is adhered, as for the ultraviolet curable resin 42 constituting the protective film, the excessive ultraviolet curable resin 42 is spun off by the rotation in the in-plane direction, and it is uniformly coated to thereby form the protective layer having a uniform thickness (not shown).

Figure 12D:
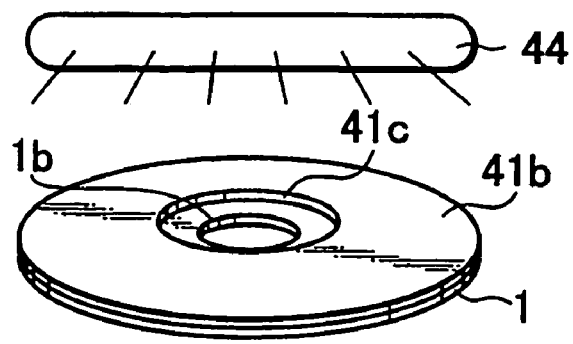

The ultraviolet curable resin 42 is filled between the disc substrate 1 and the light transmitting sheet 41a, and the excessive ultraviolet curable resin 42 is spun off. After that, as shown in FIG. 12D, the disc substrate 1 is placed within a radiation range of an ultraviolet light source 44, which is configured such that the ultraviolet can be emitted therefrom. At this time, the disc substrate 1 is arranged such that the side on which the light transmitting sheet 41a is placed is located to face the side where the ultraviolet light source 44 is installed. After that, the ultraviolet is radiated from the ultraviolet light source 44 through the light transmitting sheet 41a, to the ultraviolet curable resin 42 on the major surface of the disc substrate 1. The accumulated strength of the ultraviolet radiated at this time is set at, for example, 500 mJ/cm$^2$. The radiation of the ultraviolet causes the ultraviolet curable resin 42 to be cured between the disc substrate 1 and the light transmitting sheet 41a.

As mentioned above, the light transmitting sheet 41a is adhered through on the upper layer of the information signal area 1c on the major surface of the disc substrate 1 via the adhesive layer 41b made of the cured ultraviolet curable resin disposed therebetween. And, as shown in FIG. 9, the desirable optical disc is manufactured in which the information signal area 1c and the light transmitting layer 41 composed of the light transmitting sheet 41a and the adhesive layer 41b are formed on the major surface of the replica substrate 1a.

As explained above, according to this third embodiment, the clamp reference plane 3a is defined on the major surface of the light transmitting layer 41. Thus, it is possible to attain the effect similar to that of the first embodiment.

Also, in the third embodiment, the ultraviolet curable resin 42 is filled between the disc substrate 1 and the sheet by rotating the sheet and the disc substrate 1 laminated via the ultraviolet curable resin 42 therebetween in the in-plane direction. Thus, it is not necessary to press the disc substrate 1 and the sheet to adhere them, and the light transmitting layer having a uniform thickness can be easily formed in a short time. Hence, it is possible to improve productivity. Then, the stable reproduction performance can be obtained in the optical recording medium having such uniform film thickness. Moreover, the very thin adhesive layer can be formed to thereby suppress the deformation caused by the aging and the initial warp of the replica substrate 1a. Hence, it is possible to attain the stable performance for a long time.

The embodiments of the present invention have been actually described as mentioned above. However, the present invention is not limited to the above-mentioned embodiments. The various modifications based on the technical idea of the present invention can be made thereto.

For example, the values, the materials and the configuration of the information signal area exemplified in the above-mentioned embodiments are only examples. Values, materials and a configuration of the information signal area which are different from them may be used as necessary.

What is claimed is:

1. An optical recording medium having an information signal area on which an information signal can be recorded and/or reproduced, said medium comprising:
   a disc substrate layer having a flat annular shape, a first opening in a center and a first outer diameter; and
   a light transmitting layer having a flat annular shape, a second opening in a center and a second outer diameter;
   wherein,
   said information area is formed on said disc substrate layer,
   said light transmitting layer transmits a laser beam for recording and/or reproducing the information signal;
   said information signal is formed within said information signal area,
   a clamp reference plane is arranged on said light transmitting layer;
   said light transmitting layer comprises a light transmitting sheet, an adhesive layer through which said light transmitting sheet is adhered to the major surface of said disc substrate layer; and a protective layer formed on a side opposite to a side on which said adhesive layer of said light transmitting sheet is formed;
   said adhesive layer is made of a pressure sensitive adhesive through which said laser beam can be transmitted;
   a diameter of said second opening is larger than a diameter of said first opening and smaller than an inner circumference diameter of a clamp region in said disc substrate layer;
   the second outer diameter of the light transmitting sheet is smaller than the first outer diameter of the disc substrate layer.

2. The optical recording medium according to claim 1, wherein said light transmitting sheet is made of a thermoplastic resin through which at least said laser beam can be transmitted.

3. The optical recording medium according to claim 1, wherein said light transmitting sheet is made of a same material as that used for said disc substrate layer.

4. An optical recording medium having an information signal area on which an information signal can be recorded and/or reproduced, said medium comprising:
   a disc substrate layer having a flat annular shape, a first opening in a center and a first outer diameter; and
   a light transmitting layer having a flat annular shape, a second opening in a center and a second outer diameter;
   wherein,
   a disc substrate layer having a flat annular shape and a first outer diameter; and
   a light transmitting layer having a flat annular shape and a second outer diameter;
   said information area is formed on said disc substrate layer,
   said light transmitting layer transmits a laser beam for recording and/or reproducing the information signal;
   said information signal is formed within said information signal area,
   a clamp reference plane is arranged on said light transmitting layer;
   said light transmitting layer comprises a light transmitting sheet, an adhesive layer through which said light transmitting sheet is adhered to the major surface of said disc substrate layer; and a protective layer formed on a side opposite to a side on which said adhesive layer of said light transmitting sheet is formed;
   said adhesive layer is made of an ultraviolet curable resin through which at least said laser beam can be transmitted;
   a diameter of said second opening is larger than a diameter of said first opening and smaller than an inner circumference diameter of a clamp region in said disc substrate layer;
   the second outer diameter of the light transmitting sheet is smaller than the first outer diameter of the disc substrate layer.

5. An optical recording medium, having an information signal area on which an information signal can be recorded and/or reproduced, said medium comprising:
   a disc substrate layer having a flat annular shape, a first opening in a center and a first outer diameter; and
   a light transmitting layer having a flat annular shape, a second opening in a center and a second outer diameter;
   wherein,
   said information area is formed on said disc substrate layer,
   said light transmitting layer transmits a laser beam for recording and/or reproducing the information signal;
   said information signal is formed within said information signal area,
   a clamp reference plane is arranged on said light transmitting layer;
   said light transmitting layer comprises a light transmitting sheet, an adhesive layer through which said light transmitting sheet is adhered to the major surface of said disc substrate layer; and a protective layer formed on a side opposite to a side on which said adhesive layer of said light transmitting sheet is formed;
   said adhesive layer is made of a pressure sensitive adhesive through which said laser beam can be transmitted;

a diameter of said second opening is larger than a diameter of said first opening and smaller than an inner circumference diameter of a clamp region in said disc substrate layer;

the second outer diameter of the light transmitting sheet is smaller than the first outer diameter of the disc substrate layer, wherein a sum of a thickness of said disc substrate in said clamp region and a film thickness of said light transmitting layer is 1.0 mm or more and 1.4 mm or less.

6. A method of manufacturing an optical recording medium having an information signal area on which an information signal can be recorded and/or reproduced, said medium comprising:

a disc substrate layer having a flat annular shape, a first opening in a center and a first outer diameter; and a light transmitting layer having a flat annular shape, a second opening in a center and a second outer diameter, wherein, said information area is formed on said disc substrate layer, said light transmitting layer transmits a laser beam for recording and/or reproducing the information signal;

said information signal is formed within said information signal area;

a clamp reference plane is arranged on a major surface of said light transmitting layer in a clamp region of said optical recording medium;

said light transmitting layer comprises a light transmitting sheet and an adhesive layer through which said light transmitting sheet is adhered to the major surface of said disc substrate layer, said adhesive layer is made of a pressure sensitive adhesive through which said laser beam can be transmitted;

a diameter of said second opening is larger than a diameter of said first opening and smaller than an inner circumference diameter of the clamp region in said disc substrate layer; and the second outer diameter of the light transmitting sheet is smaller than the first outer diameter of the disc substrate layer.

7. The method of manufacturing an optical recording medium according to claim 6, wherein said clamp reference plane has an annular shape.

8. The method of manufacturing an optical recording medium according to claim 7, wherein a diameter of an innermost circumference of said clamp reference plane is 22 mm or more and 24 mm or less and a diameter of an outermost circumference of said clamp reference plane is 32 mm or more and 34 mm or less.

9. The method of manufacturing an optical recording medium according to claim 7, wherein said method includes a step of laminating said light transmitting sheet onto the major surface of said disc substrate through said adhesive layer disposed therebetween.

10. The method of manufacturing an optical recording medium according to claim 6, wherein said light transmitting layer comprises a protective layer formed on a plane opposite to a side on which said adhesive layer is formed, and said method includes a step of laminating said light transmitting sheet onto the major surface of said disc substrate layer through said adhesive layer disposed therebetween.

11. The method of manufacturing an optical recording medium according to claim 10, wherein said light transmitting sheet is made of a thermoplastic resin through which at least said laser beam can be transmitted.

12. The method of manufacturing an optical recording medium according to claim 10, wherein said light transmitting sheet is made of a same material as that used for said disc substrate layer.

13. The method of manufacturing an optical recording medium according to claim 6, wherein a film thickness of said light transmitting layer is 90 μm or more and 110 μm or less.

14. A method of manufacturing an optical recording medium having an information signal area on which an information signal can be recorded and/or reproduced, said medium comprising:

a disc substrate layer having a flat annular shape, a first opening in a center and a first outer diameter; and a light transmitting layer having a flat annular shape, a second opening in a center and a second outer diameter; wherein, said information area is formed on said disc substrate layer, said light transmitting layer transmits a laser beam for recording and/or reproducing the information signal;

said information signal is formed within said information signal area;

a clamp reference plane is arranged on a major surface of said light transmitting layer in a clamp region of said optical recording medium, said clamp reference plane having an annular shape;

said light transmitting layer comprises a light transmitting sheet and an adhesive layer through which said light transmitting sheet is adhered to the major surface of said disc substrate layer, said light transmitting sheet is made of a thermoplastic resin through which at least said laser beam can be transmitted;

a diameter of said second opening is larger than a diameter of said first opening and smaller than an inner circumference diameter of the clamp region in said disc substrate layer; and the second outer diameter of the light transmitting sheet is smaller than the first outer diameter of the disc substrate layer;

wherein said method includes a step of laminating said light transmitting sheet onto the major surface of said disc substrate layer through said adhesive layer disposed therebetween.

15. A method of manufacturing an optical recording medium having an information signal area on which an information signal can be recorded and/or reproduced, said medium comprising:

a disc substrate layer having a flat annular shape, a first opening in a center and a first outer diameter; and a light transmitting layer having a flat annular shape, a second opening in a center and a second outer diameter, wherein, said information area is formed on said disc substrate layer, said light transmitting layer transmits a laser beam for recording and/or reproducing the information signal;

said information signal is formed within said information signal area;

a clamp reference plane is arranged on a major surface of said light transmitting layer in a clamp region of said optical recording medium;

said light transmitting layer comprises a light transmitting sheet and an adhesive layer through which said light transmitting sheet is adhered to the major surface of said disc substrate layer, said adhesive layer is made of a pressure sensitive adhesive through which said laser beam can be transmitted;

a diameter of said second opening is larger than a diameter of said first opening and smaller than an inner circumference diameter of the clamp region in said disc substrate layer; and the second outer diameter of the light transmitting sheet is smaller than the first outer diameter of the disc substrate layer, wherein a sum of a thickness of said disc substrate layer in said clamp region and a film thickness of said light transmitting layer is 1.0 mm or more and 1.4 mm or less.

* * * * *